(12) United States Patent
Nurnus et al.

(10) Patent No.: US 12,085,456 B2
(45) Date of Patent: Sep. 10, 2024

(54) ASSESSING THE MEASUREMENT QUALITY OF THE SENSOR ELEMENT FOR MEASURING AN OBJECT TEMPERATURE

(71) Applicant: Innovative Sensor Technology IST AG, Ebnat-Kappel (CH)

(72) Inventors: Joachim Nurnus, Neuenburg am Rhein (DE); Florian Krogmann, Kreuzlingen (CH)

(73) Assignee: Innovator Sensor Technology IST AG, Ebnat-Kappel (CH)

( * ) Notice: Subject to any disclaimer, the term of this patent is extended or adjusted under 35 U.S.C. 154(b) by 253 days.

(21) Appl. No.: 17/755,708

(22) PCT Filed: Nov. 2, 2020

(86) PCT No.: PCT/EP2020/080641
§ 371 (c)(1),
(2) Date: May 5, 2022

(87) PCT Pub. No.: WO2021/089460
PCT Pub. Date: May 14, 2021

(65) Prior Publication Data
US 2022/0381622 A1 Dec. 1, 2022

(30) Foreign Application Priority Data
Nov. 5, 2019 (DE) .......................... 102019129820.2

(51) Int. Cl.
*G01K 7/04* (2006.01)
*G01K 1/143* (2021.01)
*G01K 15/00* (2006.01)

(52) U.S. Cl.
CPC ............... *G01K 7/04* (2013.01); *G01K 1/143* (2013.01); *G01K 15/007* (2013.01)

(58) Field of Classification Search
CPC ......... G01K 7/04; G01K 1/143; G01K 15/007
See application file for complete search history.

(56) References Cited

FOREIGN PATENT DOCUMENTS

CN 102947683 A * 2/2013 ................ G01J 5/02
CN 111795757 A * 10/2020
(Continued)

OTHER PUBLICATIONS

Translation of JP2019174128A.*
Gierth, P. et al., Novel thermocouples for automotive application. J. Sens. Sens. Syst., 7, 43-49, 2018.

*Primary Examiner* — Mirellys Jagan
(74) *Attorney, Agent, or Firm* — Christopher R. Powers; Endress+Hauser (USA) Holding, Inc.

(57) ABSTRACT

The present disclosure includes a sensor element for registering temperature of an object, which includes: a substrate, wherein the substrate includes a platform face, which defines a first plane; a temperature detector, which is applied on a first temperature plane on the substrate and which is embodied to register the temperature of the object, wherein the first temperature plane lies in the first plane or essentially in parallel with the first plane; at least one sensor applied on a first subregion of the substrate for determining a temperature difference within the first subregion; and a passivation, which is applied on the substrate and which covers the substrate, the temperature detector and the sensor for determining the temperature difference, as well as residing in a method for assessing measurement quality of a sensor element of the present disclosure.

20 Claims, 4 Drawing Sheets

(56) References Cited

FOREIGN PATENT DOCUMENTS

| | | | |
|---|---|---|---|
| CN | 114383746 A | * | 4/2022 |
| DE | 102006011675 A1 | | 11/2006 |
| DE | 102006012338 B3 | | 7/2007 |
| DE | 102010049008 B3 | | 4/2012 |
| DE | 102013206406 A1 | | 10/2014 |
| DE | 102015114314 A1 | | 3/2017 |
| DE | 102016116101 A1 | | 3/2018 |
| JP | 2019174128 A | | 4/2021 |

* cited by examiner

ASSESSING THE MEASUREMENT QUALITY OF THE SENSOR ELEMENT FOR MEASURING AN OBJECT TEMPERATURE

CROSS-REFERENCE TO RELATED APPLICATIONS

The present application is related to and claims the priority benefit of German Patent Application No. 102019129820.2, filed on Nov. 5, 2019, and International Patent Application No. PCT/EP2020/080641, filed Nov. 2, 2020, the entire contents of which are incorporated herein by reference.

TECHNICAL FIELD

The invention relates to a sensor element for registering temperature of an object. Furthermore, the invention relates to a method for assessing the measurement quality of a sensor element of the invention.

BACKGROUND

Described at length in the state of the art are constructions of temperature sensors. These comprise, usually, a thermistor, which upon a temperature change experiences a change of its electrical resistance. Because the material and the characteristic line (electrical resistance versus temperature ranges) of a thermistor are known, registering the electrical resistance leads to the current temperature of the thermistor. Such temperature sensors are produced, for example, using thin film technology and have as thermistor a functional layer of, for example, platinum.

For registering temperature of an object, temperature sensors are thermally coupled to the object to be measured, for example, using soldering or silver sintering. Examples of methods for associating a temperature sensor with an object to be measured, whereby a good thermal coupling between the temperature sensor and the object is achieved, are described, for example, in DE 102015114314 A1 and in DE 102016116101 A1. An example of an object, with which the temperature sensor is associated, is a housing, for example, a small tube. The temperature sensor is introduced into the interior of the housing to protect against external influences. The housing is then brought in contact with a medium. The temperature sensor can then determine temperature of the medium based on the temperature of the housing.

In coupling a temperature sensor to an object to be measured, there often arise unknown, or undefined, thermal contact resistances and, directly resulting therefrom, heat flows, which lead to a difference between the temperature measured by the temperature sensor and the true temperature of the object. Other sources of error, which can lead to a deviation of the temperature measured by the temperature sensor and the true temperature of the object, are temperature gradients on the upper side of a temperature sensor caused by convection, radiation, etc., as well as heat drain, or supply, in the electrical leads of a temperature sensor.

SUMMARY

Based on the above, an object of the invention is to provide a sensor element, which enables detecting heat flows within the sensor element.

The object is achieved by a sensor element as claimed and by a method as claimed in the present disclosure.

As regards the sensor element, it is provided according to the invention that the sensor element serves for registering temperature of an object and the sensor element comprises:
a substrate, wherein the substrate includes a platform face, which defines a first plane;
a temperature detector, which is applied on the substrate in a first temperature plane and which is embodied to register the temperature of the object, wherein the first temperature plane lies in the first plane or essentially in parallel with the first plane;
at least one sensor applied on a first subregion of the substrate for determining a temperature difference within the first subregion; and
a first passivation, which is applied on the substrate and which covers the substrate, the temperature detector and the sensor for determining the temperature difference.

The sensor elements described in the state of the art, which serve for registering temperature, lead, such as above mentioned, frequently to a temperature difference and, as a result, to a heat flow in the sensor element. By providing an additional sensor, which registers a temperature difference, a heat flow sensor can be formed, which enables information concerning the quality of the object temperature ascertained by the temperature detector, this in turn being synonymous with a heat flow flowing in the direction of the temperature difference. To this end, the extra sensor yields a measured variable, for example, a voltage. The greater the measured variable turns out to be, the greater is the heat flow in the sensor element, thus, the lower the accuracy of the object temperature ascertained by the temperature detector.

The substrate is frequently a flat, rigid component, especially composed of a semiconductor or ceramic material. The height, or thickness, of the substrate is significantly less than its width and length. Moreover, the substrate is, as a rule, planar. A surface spanned by the width and length of the substrate is referred to as platform face, which forms a two dimensional plane in the x and y directions. The temperature detector is applied on a first temperature plane. Such is either the first plane, thus, the platform face, or a second plane parallel to the platform face, thus, a plane offset from the platform face of the substrate, for example, when one or more other layers, for example, a first passivation, is, or are, located between the platform face and the temperature detector. Referred to as temperature plane is, in principle, a geometric plane. Such can either be an isothermal plane, whose temperature at each point of the plane differs by the same value from the object temperature, or the temperature values in this plane differ over the entire plane. Both cases can be detected by means of a sensor element of the invention.

The temperature detector is especially a structured layer, which is applied and structured by means of a thick film or thin film method.

The sensor for determining a temperature difference is applied on the substrate in such a manner that such enables measuring heat flow in at least one direction (x, y direction, or z direction orthogonal to the first plane). The sensor includes two contacts. The heat flow is measured in the connection direction of the two contacts.

Alternatively, also a flexible substrate can be used, for example, a film, or a curved substrate. The material of such a substrate comprises, for example, a polymer or metal, especially stainless steel. The platform face, and therewith the first plane, can, in such case, thus, be curved. The additional planes, or temperature planes are then in parallel with such curved plane.

The temperature detector and the thermocouple are connected by means of conductive traces with contact pads in such a manner that the temperature detector and the thermocouple have separate contact pads. Alternatively, the temperature detector and the thermocouple share a first contact, while the second contacts are separate. The temperature measured by the temperature detector and the temperature difference registered by the thermocouple can thus be separately read out.

Besides registering heat flows, the sensor element of the invention can also be used for other applications. For example, a value for the quality of radiation, e.g., a laser beam, incoming to the sensor element can be measured, especially regarding an equally shaped intensity distribution over the cross-section of the laser beam. The temperature detector determines temperature of the laser beam, while the thermocouple quantifies the radiated power.

An advantageous embodiment of the sensor element of the invention provides that the sensor for determining the temperature difference comprises a first thermocouple, which is composed of a conductor pair of different materials, wherein the conductor pair has a contacting point in the first temperature plane and a reference point removed from the contacting point and wherein the thermocouple is embodied in such a manner that it produces an output voltage, which represents a measure for a temperature difference between the contacting point and the reference point. The imaginary connection between the contacting point and the reference point corresponds to the direction of the heat flow to be detected. Thermocouples are especially advantageous, since they require no external electrical power.

Thermocouples yield a voltage as measured variable. This voltage depends on the temperature difference present between the contacting point and the reference point, thus:

$$U=S*(\Delta T)$$

S refers to the thermoelectric coefficient of the material combination of the two conductors (units μV/K). The positioning of the thermocouple yields the direction of the heat flow, since the temperature difference between the reference point and the contact point is determined.

Referred to as contact point is that location of the thermocouple, at which the first end points of the two conductors lie. The thermocouple can be electrically contacted via the contact point. Referred to as reference point is that location of the thermocouple, at which the end points of the two conductors contact The contact point of the first thermocouple lies in the first plane. Only in this way can a heat flow relative to the temperature of the object registered by the temperature detector be detected, since only in such case are the thermal states of the contact point and the temperature detector the same. Advantageously, the contacting point of the thermocouple and the temperature detector can then be implemented in the same process step.

Alternatively to a thermocouple, also a further temperature detector, for example, a thermistor, mounted in a further temperature plane different from the first temperature plane can be used for measuring an absolute temperature. This further temperature detector must, however, be supplied with a voltage. By means of the further temperature detector, an absolute temperature of the second temperature plane is registrable. When this differs from the registered temperature of the temperature detector in the first temperature plane, then a heat flow is present.

A first variant of the sensor element of the invention provides that the thermocouple is mounted in such a manner such that the contacting point and the reference point lie, in each case, in the first temperature plane. The heat flow is, thus, registered on the first temperature plane either in x direction, in y direction or in a direction having x- and y-components.

A second variant of the sensor element of the invention provides that the thermocouple is mounted in such a manner that the reference point lies in a temperature plane other than the first temperature plane. The thermocouple is, in such case, for example, arranged orthogonally (z direction) to the first plane. Manufacturing such is implemented in such a manner that a layer with known thermal resistance is applied, for example, the already described, first passivation. Then, holes perpendicular to the first plane are produced in this layer, and the thermocouple is arranged, or placed, therein.

An advantageous, additional development of the sensor element of the invention provides that the sensor for determining the temperature difference includes at least one other thermocouple, which is connected electrically in series with the first thermocouple and which is arranged in such a manner that its contacting point lies in the first temperature plane and its reference point lies in the first temperature plane or in a temperature plane other than the first temperature plane.

By series connecting, the voltages produced by the thermocouples add. In the case, in which the reference points of the thermocouples lie in the same temperature plane and the materials of the thermocouples are the same, the dependence of the output voltage on the temperature difference can be expressed as follows:

$$U=N*S*(\Delta T)$$

wherein N is the number of series connected thermocouples.

In a preferred additional development of the sensor element of the invention, it is provided that the sensor element has at least one sensor applied on a second subregion of the substrate different from the first subregion for determining a temperature difference within the second subregion.

This sensor is embodied analogously to the sensor for temperature determination on the first subregion. As in the first subregion, it is also possible in the second subregion that a plurality of thermocouples are connected in series with one another. The sensor is connected with additional contact pads, such that the temperature difference can be registered separately from the temperature difference registered by the sensor of the first subregion and from the temperature registered by the temperature detector. In this way, an independent heat flow in the second subregion is detectable. Such can be used for error cause detection.

By dividing the substrate into many small subregions with separate sensors, which serve for registering temperature differences and which are advantageously arranged raster- or matrix-like, relatively exact information can be gained concerning locational courses, or origins, of heat flows. Each sensor acts, in such case, as a type of "pixel". In this way, deductions concerning the manufacturing quality, or the quality of the method, of applying the sensor element on the object can be more exact. Also, such an element can be used for exact detection of, for example, heat radiation from the environment, when each of the "pixels" contains its own absolute temperature sensor.

In an advantageous, additional development of the sensor element of the invention, it is provided that the sensor element has a cover layer, which is applied essentially completely over the first passivation or over a second passivation applied on the first passivation. By means of the second passivation, all reference points of the thermocouples and the one or more temperature detectors are protected from environmental influences.

An advantageous embodiment of the sensor element of the invention provides that the cover layer comprises a heat reflecting material, especially a metal material, or a radiation absorbing material.

A so embodied cover layer enables a passive compensation of heat flows. By means of the layer of heat reflecting material, radiation from the environment can be blocked from reaching the sensor element. Such a reflecting layer is composed, for example, of gold or aluminum. Likewise, heat flows can be reflected. This means that heat flows are reduced and the temperature measured by the temperature detector is closer to the true temperature of the object.

The radiation absorbing material can be, for example, a material in the form of a porously embodied metal, preferably of gold, platinum, black-gold, black-platinum or a porous metal oxide.

In an alternative, advantageous, additional development of the sensor element of the invention, it is provided that the sensor element has an encapsulation composed of a heat conductive material, which is arranged in such a manner that the encapsulation essentially completely covers and heat conductively contacts the first passivation or a second passivation applied on the first passivation and that the encapsulation heat conductively contacts the substrate, and, especially, the object. In the latter case, the encapsulation contacts the object preferably through the substrate.

This form of embodiment represents another type of passive compensation of heat flows. The encapsulation forms a kind of "thermal shield" for measured objects of high heat capacity. The measured object acts, in such case, as a heat sink. Especially used for this are materials, which have high thermal conductivity and which are compatible with the environmental conditions. Examples include platinum, diamond, diamond-like carbon (DLC), ceramic materials and glasses.

In a preferred additional development of the sensor element of the invention, it is provided that the sensor element comprises a cooling- and/or heating unit, which is mounted in a different temperature plane parallel to the first temperature plane.

This represents a measure for active compensation of heat flows, for which purpose additional electrical energy is required. The heating power, or cooling power, is increased until the heat loss due to the heat flows is significantly reduced (this is detected by means of the sensor by a lessening of the temperature difference), or compensated (in such case, there is no longer any temperature difference ascertained by the sensor).

An advantageous embodiment of the sensor element of the invention provides that the cooling- and/or heating unit comprises a thermistor and/or a thermocouple. The thermistors, or thermocouples, used for this purpose do not have to be identical in type and construction with the sensor elements applied typically in thin film technology, or thick film technology, or with the temperature detector and sensor already located in the sensor element.

An advantageous embodiment of the sensor element of the invention provides that the temperature detector is a thermistor and is composed of a material having a defined temperature coefficient, especially platinum or nickel. In such case, it can be advantageously provided that the contacts of the components of the thermocouple in the plane of the temperature detector are composed of the same material as the temperature detector. In this way, the contacting point of the thermocouple is as close as possible at the temperature plane of the thermistor.

An advantageous embodiment of the sensor element of the invention provides that the thermocouple and/or the other thermocouple are/is composed of compound semiconductors. Thus, each conductor is composed of a different material. For example, a (Bi,Sb)2(Te,Se)3-compound semiconductor pair can be applied. Alternatively to compound semiconductors, the following materials, or material combinations, can be used: Bi—BiSb, Ni, NiCr, Cu, Pt, PtRh. In addition, also other material combinations can be used, depending on technology and utilized temperature range.

An advantageous embodiment of the sensor element of the invention provides that the first passivation and/or the second passivation is composed of a glass, a ceramic material or a plastic. Used for this are typically materials having low thermal conductivity, which can be matched to the intended temperature range and are structurable in suitable manner and permit an integration of sensors, e.g., thermocouples (for example, such as above described, by providing the holes). Necessarily, the thermal resistance of the material must be known, in order that later the heat flow can be quantified.

As regards the method, it is provided that the method of the invention serves for assessing the measurement quality of a sensor element of the invention, thus that the sensor element thermally contacts the surface of the object, that the sensor element is connected with an operation/evaluation unit, and that the operation/evaluation unit via the temperature detector registers a temperature of the object and wherein the operation/evaluation unit registers an output voltage of the sensor.

As above described, the registered output voltage represents a measure for a heat flow present in the sensor element. Based on the output voltage, the heat flow can be calculated. For this, there must be known: the thermal resistance of the first passivation between the temperature detector and the sensor for obtaining the temperature registration, and, in the case of a thermocouple, the thermal resistance of the first passivation between contact- and reference point of the thermocouple.

The heat flow can be calculated to a first approximation by:

$$Q = \frac{\Delta T}{R_{th}} = \frac{U}{N * S * R_{th}}$$

wherein U is the registered output voltage and $R_{th}$ refers to thermal resistance of the passivation.

In an advantageous embodiment of the method of the invention, it is provided that the operation/evaluation unit supplies an electrical power to the cooling- and/or heating unit for heating, or cooling, the sensor element as a function of registered output voltage. The operation/evaluation unit includes a control unit, which controls the electrical power.

An advantageous embodiment of the method of the invention provides that the operation/evaluation unit calculates a true temperature of the object based on the registered output voltage. For this, the control unit controls the electrical power in such a manner that the registered output voltage of the sensor approaches zero. This means that the heat flow detected by the sensor element likewise approaches zero. Since, in such case, no temperature gradient is present, the measured temperature in the first temperature plane corresponds to the sought object temperature. This method is called "zero heat flux measurement". In the embodiment described here, this can be implemented especially advantageously, in that both the temperature sensor and the contact location of the thermocouple as well as the cooling- and/or heating unit and the reference point of the thermocouple are manufactured in the same step.

BRIEF DESCRIPTION OF THE DRAWINGS

The invention will now be explained in greater detail based on the appended drawing, the figures of which show as follows.

DETAILED DESCRIPTION

Figure 1:
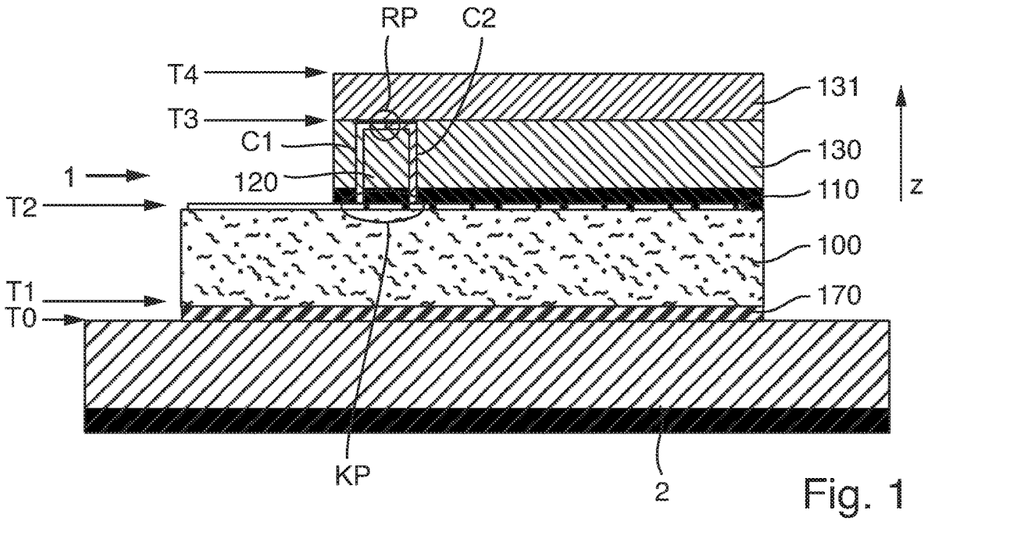
FIG. 1 shows a first example of an embodiment of a sensor element of the present disclosure.
Figure 3:
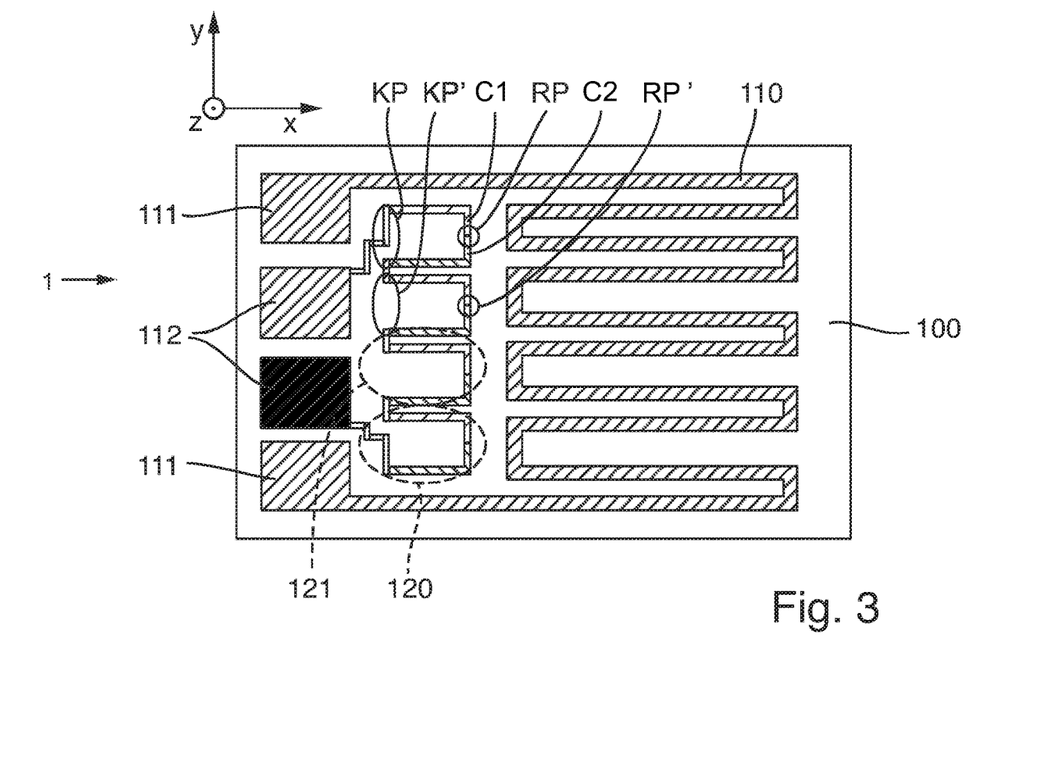
FIG. 3 shows a third example of an embodiment of a sensor element of the present disclosure.

FIG. 1 shows in cross-section a schematic view of a first example of an embodiment of a sensor element 1 of the invention. The sensor element 1 is composed of a planar substrate 100, for example, a ceramic substrate, for example, $Al_2O_3$. The upper surface of the substrate defines a first plane in x and y directions. Applied on the substrate 100 per thin film or thick film technology is a temperature detector 110. Temperature detector 110 is especially a thermistor. Temperature detector 110 is embodied as meander-shaped, such as shown in FIG. 3, and is electrically suppliable via contact pads 111. Applied on the substrate 100 and on the temperature detector 110, especially per thick film technology, are first and second passivations 130, 131. The passivations 130, 131 are especially of the same material, for example, a glass, a ceramic material or a plastic (for example, polyimide, $SiO_2$ or $Al_2O_3$). They are, however, produced in two different manufacturing steps. The structuring of the passivations 130, 131, for example, in the form of holes for below described thermocouples 120 or contact pads, occurs, for example, via a lithography and/or etching method.

The bottom face of the substrate 100 of the sensor element 1 is connected with an object 2, whose temperature is to be determined. For this, a connecting layer 170 is provided, for example, an adhesive layer, a sintered layer or a solder layer, which establishes a heat conducting bond between the substrate 110 and the object 2. The object 2 is, for example, a carrier, especially a small plate or a small tube, which is in contact with a measured medium. It can, however, also be a less generic object 2, for example, a housing of a pump, to which the substrate is secured.

In such a construction, there arise, because of the different materials, a plurality of temperature planes T0, T1, T2, T3, T4, which lie essentially parallel with the first plane defined by the substrate. The temperature plane T0 is the surface temperature of the object 2. The temperature plane T1 is the transition between the connecting layer 170 and the substrate 110. The temperature plane T2, also referred to as first temperature plane, is that temperature plane, in which the temperature detector 110 lies and whose temperature the temperature detector 110 registers.

The temperature plane T3 lies in the transition between the two passivations 130, 131. The temperature plane T4 lies on the upper surface of the upper passivation 131.

This basic sensor construction forms the basis for all examples of embodiments described in the following.

The materials of the sensor element 1 are selected in such a manner that the absolute temperature difference between the individual temperature planes T0, T1 is very small, or negligible, and, thus, the temperature detector 110 is in good thermal contact with the object 2. Along with this, the materials of the passivations 130, 131 are so selected or so embodied that the temperature detector is insulated as well as possible from the environment. Under ideal measuring conditions, there are no heat flows in the component, neither in the x-y plane nor in the z direction. In such case, temperature measured by the temperature detector 110 corresponds to the temperature of the object to be measured. As a result of the, as a rule, different temperatures of the component surface (here temperature plane T4) and the environment (for example, air) and/or as a result of heat input, or heat loss, from the contacting wires (not shown), local heat flows occur, which produce local temperature differences in the component. This cannot be detected by the temperature detector 110, since, first, the temperature detector 110 only delivers an absolute temperature value without comparison and, second, the temperature detector 110 registers an integral value integrated over the area spanned by it. Such can lead to the fact that the temperature measured by the temperature detector 110 differs from the true, absolute temperature of the object 2.

To overcome this problem, according to the invention, at least one other sensor, for instance, in the form of a thermocouple 120, is integrated into the sensor element 1. The thermocouple is composed of two conductors, which meet in a shared reference point RP and which have a contacting point KP, via which the thermocouple 120 can be electrically contacted. Thermocouple 120 is integrated into the first passivation 130. In the example of an embodiment shown in FIG. 1, first, the first passivation 130 is applied. Thereafter, the passivation 130 is provided with holes, into which the thermocouple 120 is installed. Then, the second passivation 131 is applied. The contacting point KP of the thermocouple is located thereby in the first temperature plane T2, while the reference point RP is located in the temperature plane T3. The conductors of the thermocouple are made of mutually differing materials, for example, two different compound semiconductors. As a result of this manner of construction, thermocouple 120 produces an output voltage, which results from a temperature difference between the reference point RP and the contacting point KP and which is proportional to the size of the temperature difference. The output voltage is registrable via separate contact pads 112. In the present case, the thermocouple registers a temperature difference between the temperature plane T3 and the temperature plane T2, where the temperature detector is located. Thus, a heat flow is registrable in the z direction, thus, orthogonally to the temperature planes T0, T1, T2, T3, T4, and, thus, to the first plane. The output voltage depends on the temperature difference as follows:

$$U = S*(T3 - T2)$$

where S refers to the thermoelectric coefficient of the material combination of two conductors (units μV/K).

The higher the output voltage, the higher is the temperature difference between the temperature planes T2 and T3. Correspondingly poorer is the informational quality of the temperature registered by the temperature detector 110, and the greater the deviation of the temperature registered by the temperature detector 110 from the true temperature of the object 2.

Figure 2:
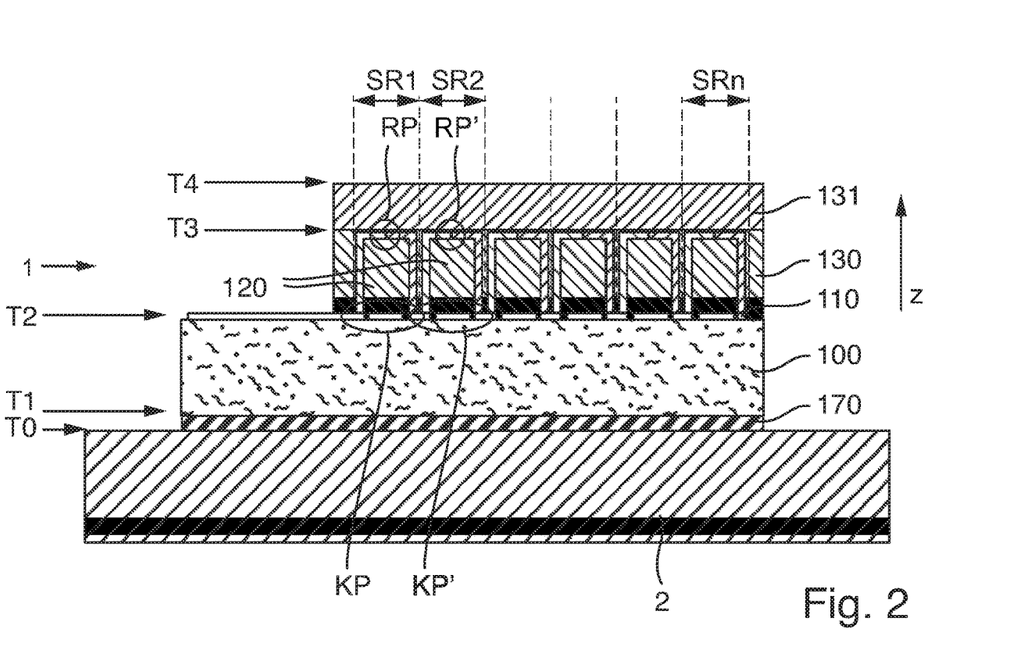
FIG. 2 shows a second example of an embodiment of a sensor element of the present disclosure.

FIG. 2 shows another example of an embodiment. In such case, a plurality of thermocouples 120, 120' are used, whose contacting points KP, KP' lie, in each case, in the temperature plane T2 and whose reference points RP lie, in each case, in the temperature plane T3. The thermocouples are arranged at different sites on the platform plane in x and/or y direction. In such case, there are, in principle, two circuit types:
1) The plurality of thermocouples 120, 120' are connected serially together. In this way, the output voltages of all thermocouples add to a common output voltage, which can be taken via the contact pads 112. Such a serial circuit increases the sensitivity of registering heat flows. The heat flow in the z direction is, in such case, however, not locally determinable, but is, instead, integrated over the area spanned by the thermocouples.
2) Each of the thermocouples is separately contactable and delivers its own output voltage. For this, each of the thermocouples has separate contact pads. The substrate is thereby divided into a plurality of subregions SR1, SR2, . . . , SRn. In this way, a plurality of local heat flows are registrable, since each of the thermocouples detects a local heat flow of its subregion SR1, SR2, . . . , SRn. It is also possible per subregion SR1, SR2, . . . , SRn to provide pluralities of serially connected thermocouples, in order to increase the sensitivity.
3) A combination of 1) and 2):
Each of the subregions SR1, SR2, . . . , SRn has a plurality of thermocouples, which are serially connected in the subregions SR1, SR2, . . . , SRn. In this way, the sensitivity is increased for registering heat flows in each separate subregion SR1, SR2, . . . , SRn.

Especially advantageously, the thermocouples are arranged raster-like or matrix-like. In this way, sites can be relatively exactly detected, where the sensor element 1 has local defects. For example, a map can be formed, by means of which the values of heat flows are displayed as a function of location.

The sensor element shown in the plan view of FIG. 3 includes thermocouples 120, 121, whose reference points RP, RP' and contacting points KP, KP' lie in the same temperature plane T3. In this way, a heat flow in x and/or y direction is detectable. As shown, the thermocouples 120, 120' are connected together in series. In this way, the output voltages of all thermocouples add to a common output voltage, which can be accessed via the contact pads 112. Also in such case, it is, however, possible to provide that each of the thermocouples is separately contactable via its own contact pads and delivers its own output voltage. Also in such case, the division into different subregions SR1, SR2, . . . , SRn is possible, which are provided with one or more separate thermocouples.

Figure 4:
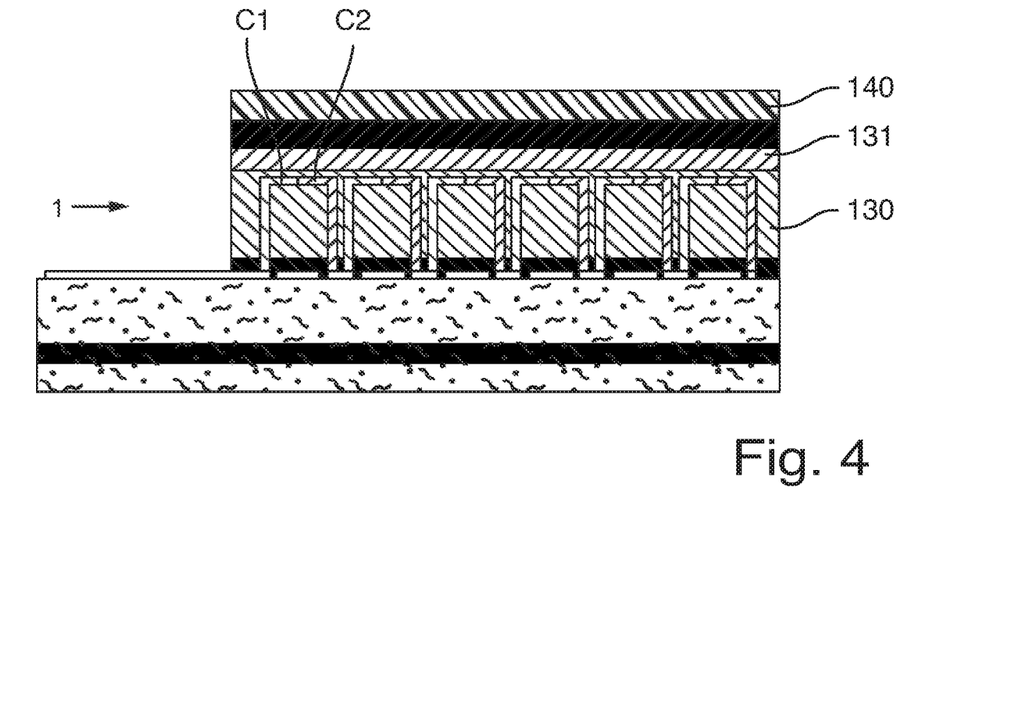
FIG. 4 shows a first variant of the present disclosure for passive reduction of heat flows.

FIG. 4 shows a first option for reducing heat flows. Such is usable for all previously shown forms of embodiment of the sensor element 1, as well as for the example of an embodiment shown in FIG. 7. In particular, a cover layer 140 is applied on the second passivation 131.

Such is composed, for example, of a heat reflecting material, for example, gold or silver. This leads to a reflection of arriving radiation and prevents, moreover, that heat due to unwanted heat flows escapes from the passivation 131. This enables that the temperature measured by the temperature detector is closer to the true temperature of the object.

Alternatively, the cover layer 140 is composed of a heat absorbing material. Advantageous are porous, inert materials, such as black-gold, platinum or metal oxides. In-coupling of radiation from the environment is resisted by the surface configuration in the particular application.

Figure 5:
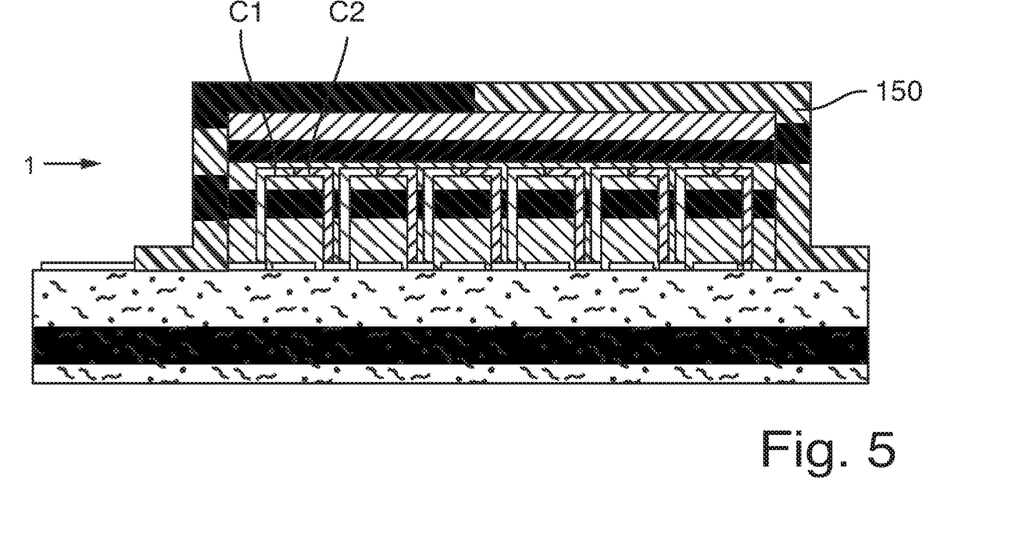
FIG. 5 shows a second variant of the present disclosure for active reduction of heat flows.

FIG. 5 shows a second opportunity for reducing heat flows. Instead of the cover layer 140, an encapsulation 150 is provided, which is arranged in such a manner that it essentially completely covers and heat conductively contacts the upper passivation 131 and that it heat conductively contacts the substrate 100, and, especially, the object 2. The encapsulation 150 forms a type of "thermal shield" for measured objects of high heat capacity. The measured object acts, in such case, as a heat sink. Used as encapsulation is, for example, a metal tube or a solid plate of a metal material.

Figure 6:
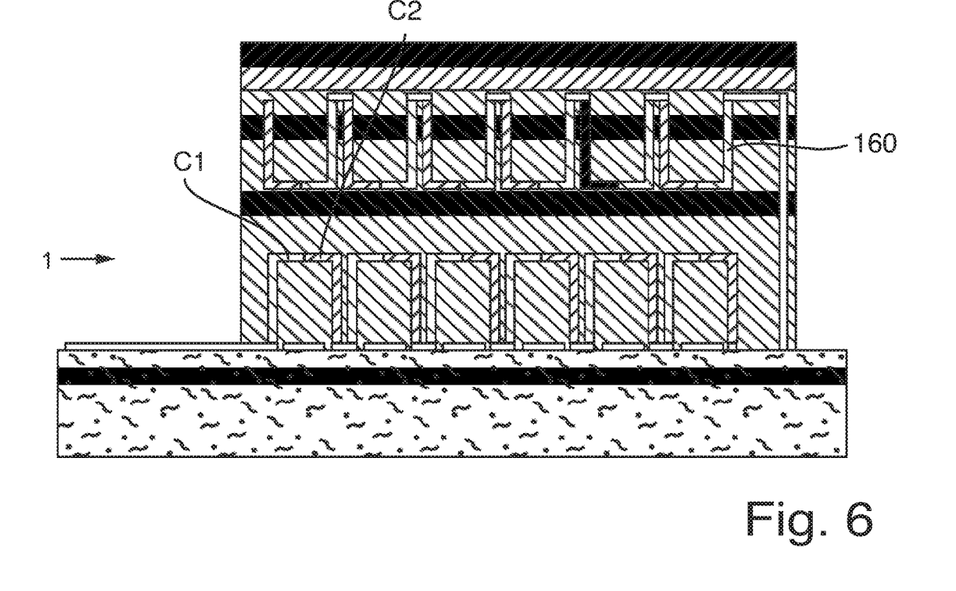
FIG. 6 shows an example of an embodiment for compensating heat flows.

An embodiment for active compensation of heat flows is shown in FIG. 6. Such is again usable for all previously shown forms of embodiment of the sensor element 1, as well as for the example of an embodiment shown in FIG. 7 and is also combinable with the reduction mechanisms shown in FIGS. 4 and 5.

In this case, a cooling and/or heating unit 160 is provided, which is suppliable with electrical energy via separate contact pads. By the supplying of the electrical energy, the cooling and/or heating unit 160 produces heat or else it cools its surroundings. Suitable as heating unit is especially a thermistor or heating wire. Suitable as cooling unit is especially a thermoelectric Peltier cooler. The cooling and/or heating unit 160 is arranged in a temperature plane other than that containing the thermocouples.

Especially, the cooling and/or heating unit 160 includes a control unit, which increases the heating power, or cooling power, until the heat loss produced by the heat flows is significantly reduced (such is detected by means of the sensor by a temperature difference becoming smaller), or is compensated (in such case, a temperature difference is no longer detected by means of the sensor).

There can also be provided for each of the subregions SR1, SR2, . . . , SRn an independent, separate cooling and/or heating unit 160, which selects the heating power, or cooling power in accordance with the temperature difference detected in its subregion SR1, SR2, . . . , SRn.

Figure 7:
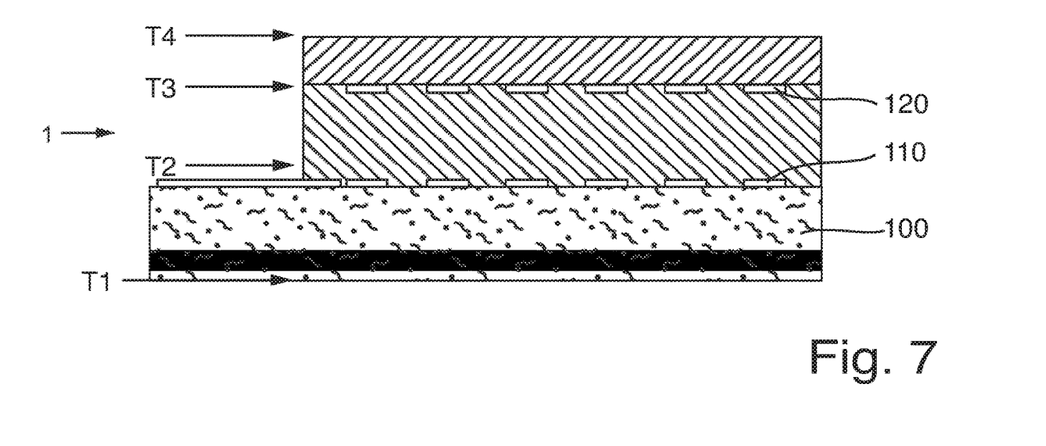
FIG. 7 shows a fourth example of an embodiment of a sensor element of the present disclosure.

FIG. 7 shows a final, alternative example of an embodiment of a sensor element 1 of the invention. Instead of one or more thermocouples, a further temperature detector is provided as a sensor 120. This must, in contrast to a thermocouple, however, be supplied with an electrical voltage, in order to produce a measurement signal. By means of the further temperature detector, an absolute temperature of the temperature plane, in which the temperature detector is arranged, is registrable. When this differs from the temperature registered by the temperature detector in the temperature plane T2, then a (e.g., unwanted) heat flow is present.

Common to all examples of embodiments is that an unwanted heat flow is detectable based on a temperature difference between different temperature planes, or different sites on the same temperature plane. It must be considered, however, that alone from the separation of the temperature planes from one another, a temperature difference can occur, without that the sensor element 1 is defective or the adhesive bond to the object 2 is defective. In such case, reference values can be registered earlier or in situ. If the registered temperature difference differs from these reference values over the course of operating time of a sensor element or in the case of construction of a plurality of different sensor elements 1, then such can be an indicator of unwanted heat flow. The cause of this can be, for example, a temporal change of the contacting layer 170, for example, due to delamination, and/or a defective contacting of a sensor element 1.

For all forms of embodiment, alternatively also a flexible substrate, for example, a film, or a curved substrate, can be used. The platform face, and therewith the first plane, can, in such case, thus, be curved. The additional planes, or temperature planes T0, T1, T2, T3, T4 are then oriented in parallel with such curved plane.

LIST OF REFERENCE CHARACTERS

1 sensor element
100 substrate
110 temperature detector
111, 112 contact pads
120, 121 sensor for determining a temperature difference
130 first passivation
131 second passivation
140 cover layer
150 encapsulation
160 cooling and/or heating unit
170 connecting layer for coupling to the object to be measured
2 object
RP, RP' reference point
KP, KP' contacting point
T0, T1, T2, T3, T4 temperature planes
SR1, SR2, SRn subregions of the substrate
C1, C2 conductor pair

The invention claimed is:

1. A sensor element for registering a temperature of an object, the sensor element comprising:
a substrate including a platform face, which defines a first plane;
a temperature detector applied on the substrate in a first temperature plane and configured to register the temperature of the object, wherein the first temperature plane lies in the first plane or substantially parallel to the first plane;
at least one temperature sensor applied on a first subregion of the substrate and configured to determine a first temperature difference within the first subregion; and
a first passivation applied on the substrate as to cover the substrate, the temperature detector' and the at least one temperature sensor,
wherein the at least one temperature sensor comprises a first thermocouple, which comprises a conductor pair of different materials, wherein the conductor pair includes a contacting point in the first temperature plane and a reference point separated at a distance from the contacting point, and wherein the first thermocouple is configured as to produce an output voltage, which represents a measure for the first temperature difference between the contacting point and the reference point, and
wherein the first thermocouple is mounted such that both the contacting point and the reference point lie in the first temperature plane.

2. The sensor element of claim 1, comprising at least one temperature sensor applied on a second subregion of the substrate and configured to determine a second temperature difference within the second subregion, wherein the second subregion is different than the first subregion.

3. The sensor element of claim 1, wherein the first passivation comprises a glass, a ceramic material' or a plastic.

4. The sensor element of claim 1, wherein the at least one temperature sensor includes at least one other thermocouple, which is connected electrically in series with the first thermocouple and which is arranged such that a contacting point of the at least one other thermocouple lies in the first temperature plane and a reference point of the at least one other thermocouple lies in the first temperature plane or in a temperature plane other than the first temperature plane.

5. The sensor element of claim 4, wherein the first thermocouple and/or the at least one other thermocouple comprise a compound semiconductor.

6. The sensor element of claim 1, wherein the temperature detector is a thermistor and comprises a material having a defined temperature coefficient.

7. The sensor element of claim 6, wherein the material of the temperature detector is platinum or nickel.

8. A method for assessing a measurement quality of the sensor element according to claim 1, wherein the sensor element is connected with an operation/evaluation unit, the method comprising:
thermally contacting a surface of the object with the sensor element;
registering a first temperature of the object with the operation/evaluation unit via the temperature detector;
registering an output voltage of the at least one temperature sensor with the operation/evaluation unit; and
calculating a true temperature of the object based on the registered output voltage using the operation/evaluation unit, wherein a temperature difference between the first temperature and the true temperature defines the measurement quality.

9. The method of claim 8, wherein the sensor element further comprises a cooling and/or heating unit mounted in a different temperature plane parallel to the first temperature plane, the method further comprising:
supplying electrical power to the cooling and/or heating unit via the operation/evaluation unit as a function of the registered output voltage to cool and/or heat the sensor element so as to reduce the temperature difference.

10. A sensor element for registering a temperature of an object, the sensor element comprising:
a substrate including a platform face, which defines a first plane;
a temperature detector applied on the substrate in a first temperature plane and configured to register the temperature of the object, wherein the first temperature plane lies in the first plane or substantially parallel to the first plane;
at least one temperature sensor applied on a first subregion of the substrate and configured to determine a temperature difference within the first subregion;
a first passivation applied on the substrate as to cover the substrate, the temperature detector and the at least one temperature sensor; and
a cover layer applied substantially completely over the first passivation or over a second passivation applied on the first passivation.

11. The sensor element of claim 10, wherein the cover layer comprises a heat reflecting material or a heat absorbing material.

12. A sensor element for registering a temperature of an object, the sensor element comprising:
- a substrate including a platform face, which defines a first plane;
- a temperature detector applied on the substrate in a first temperature plane and configured to register the temperature of the object, wherein the first temperature plane lies in the first plane or substantially parallel to the first plane;
- at least one temperature sensor applied on a first subregion of the substrate and configured to determine a first temperature difference within the first subregion; and
- a cooling and/or heating unit mounted in a different temperature plane parallel to the first temperature plane.

13. The sensor element of claim 12, wherein the at least one temperature sensor comprises a first thermocouple, which comprises a conductor pair of different materials, wherein the conductor pair includes a contacting point in the first temperature plane and a reference point separated at a distance from the contacting point, and wherein the first thermocouple is configured as to produce an output voltage, which represents a measure for the first temperature difference between the contacting point and the reference point, and
wherein the first thermocouple is mounted such that the reference point lies in a temperature plane other than the first temperature plane.

14. The sensor element of claim 12, wherein the cooling and/or heating unit comprises a thermistor and/or thermoelectric material.

15. The sensor element of claim 12, comprising at least one temperature sensor applied on a second subregion of the substrate and configured to determine a second temperature difference within the second subregion, wherein the second subregion is different than the first subregion.

16. The sensor element of claim 12, wherein the at least one temperature sensor comprises a first thermocouple, which comprises a conductor pair of different materials, wherein the conductor pair includes a contacting point in the first temperature plane and a reference point separated at a distance from the contacting point, and wherein the first thermocouple is configured as to produce an output voltage, which represents a measure for the first temperature difference between the contacting point and the reference point, and
wherein the first thermocouple is mounted such that both the contacting point and the reference point lie in the first temperature plane.

17. The sensor element of claim 12, wherein the at least one temperature sensor includes at least one other thermocouple, which is connected electrically in series with the first thermocouple and which is arranged such that a contacting point of the at least one other thermocouple lies in the first temperature plane and a reference point of the at least one other thermocouple lies in the first temperature plane or in a temperature plane other than the first temperature plane.

18. The sensor element of claim 12, wherein the temperature detector is a thermistor and comprises a material having a defined temperature coefficient.

19. The sensor element of claim 12, further comprising a first passivation applied on the substrate as to cover the substrate, the temperature detector' and the at least one temperature sensor.

20. A sensor element for registering a temperature of an object, the sensor element comprising:
- a substrate including a platform face, which defines a first plane;
- a temperature detector applied on the substrate in a first temperature plane and configured to register the temperature of the object, wherein the first temperature plane lies in the first plane or substantially parallel to the first plane;
- at least one temperature sensor applied on a first subregion of the substrate and configured to determine a temperature difference within the first subregion;
- a first passivation applied on the substrate as to cover the substrate, the temperature detector and the at least one temperature sensor; and
- an encapsulation comprising a heat conductive material, wherein the encapsulation substantially completely covers and heat conductively contacts the first passivation, and wherein the encapsulation heat conductively contacts the substrate and the object.

* * * * *